No. 714,310. Patented Nov. 25, 1902.
G. LAWS.
FRUIT PARER AND CORER.
(Application filed Jan. 9, 1902.)
(No Model.)
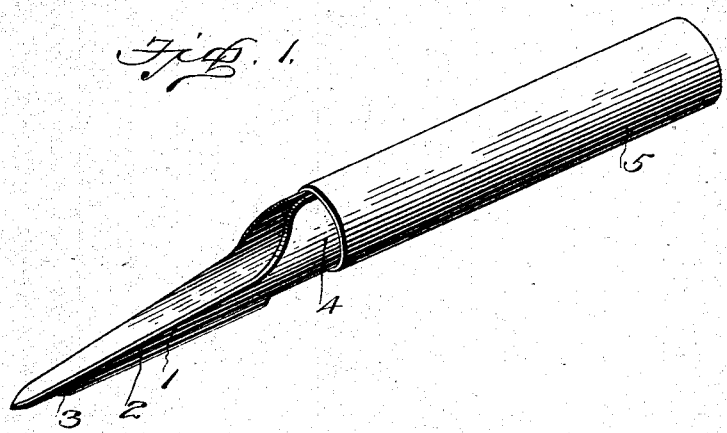
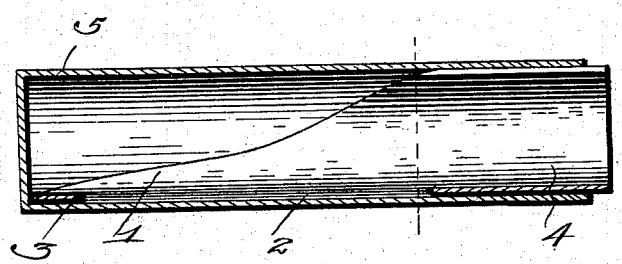
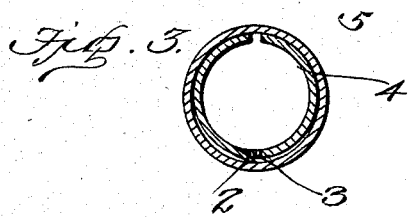
Witnesses
Inventor
George Laws
By
Attorneys

UNITED STATES PATENT OFFICE.

GEORGE LAWS, OF PHILIPSBURG, PENNSYLVANIA.

FRUIT PARER AND CORER.

SPECIFICATION forming part of Letters Patent No. 714,310, dated November 25, 1902.

Application filed January 9, 1902. Serial No. 89,065. (No model.)

*To all whom it may concern:*

Be it known that I, GEORGE LAWS, a citizen of the United States, residing at Philipsburg, in the county of Center and State of Pennsylvania, have invented certain new and useful Improvements in Fruit Parers and Corers; and I do declare the following to be a full, clear, and exact description of the invention, such as will enable others skilled in the art to which it appertains to make and use the same.

The invention relates to a fruit parer and corer especially designed for paring and coring apples.

The object of the invention is to provide an implement of this character which shall be simple of construction, durable in use, comparatively inexpensive of production, and which may be conveniently carried in the pocket and when in such position will be entirely shielded to prevent damage to the clothing or injury to the person carrying it.

With this object in view the invention consists in certain novel features of construction and combination and arrangement of parts, which will be hereinafter fully described, defined in the appended claim, and illustrated in the accompanying drawings, in which—

Figure 1 is a perspective view of my improved device, showing it in position for use. Fig. 2 is a longitudinal sectional view showing the blade of the implement placed within the handle, in which position it may be carried in the pocket. Fig. 3 is a cross-sectional view.

In the accompanying drawings, 1 denotes the blade of the implement, pointed at its outer end and curvilinear in cross-section and provided with a slicing edge 2, formed by the wall of a longitudinal slot 3. The inner end of the blade is formed with a slitted tubular shank 4, made of spring metal.

5 denotes a tubular handle, open at one end and closed at the other and of a length less than the combined length of the blade and its shank and of a diameter less than that of the shank.

In Fig. 1 I have shown the parts in position for use. In this position it will be noticed that the shank is inserted into the open end of the handle after having first been compressed in order to reduce its diameter to permit of the insertion, and after said shank is inserted into the handle the resiliency of the material of which it is composed tends to enlarge its diameter and in so doing forces the sides of the shank with frictional contact against the internal wall of the handle, and thus frictionally holds the shank in position against accidental displacement during the manipulation of the implement in the act of either coring or paring.

When the point of the implement is inserted into the handle, the extreme end of the shank will project slightly beyond the open end of the handle, owing to the fact that the combined length of the blade and shank is greater than that of the handle, so that although the shank is securely retained within the handle in this position against accidental displacement the forefinger may be inserted into the open end of the shank and the projecting portion of the shank grasped by the forefinger and thumb and be readily withdrawn when it is desired to assemble the parts for use.

From the foregoing description, taken in connection with the accompanying drawings, the construction, operation, and advantages of my improved fruit parer and corer will, it is thought, be readily apparent without requiring an extended explanation.

Various changes in the form, proportion, and the minor details of construction may be resorted to without departing from the principle or sacrificing any of the advantages of this invention.

Having thus described the invention, what is claimed, and desired to be secured by Letters Patent, is—

A tool-handle and tool, the former comprising a tube open at one end and closed at the opposite end, the closed end forming a stop, and the latter comprising a blade provided with a split resilient shank normally, or before compression, of greater diameter throughout its length than the handle, whereby, when inserted in said handle, it will be frictionally engaged throughout its length and retained securely against displacement, the combined length of the tool and its shank being greater than that of the handle, whereby when the blade is inserted in the handle it will be limited in movement by the stop, leaving a portion of the shank projecting so as to be grasped to conveniently remove the tool from the handle, substantially as described.

In testimony whereof I have hereunto set my hand in presence of two subscribing witnesses.

GEORGE LAWS.

Witnesses:
GEORGE SAINT,
MARY LAWS.